March 15, 1960 S. LUBKIN 2,929,049

MAGNETIC RECORDING ERROR INDICATOR

Filed June 21, 1954 2 Sheets-Sheet 1

INVENTOR.
SAMUEL LUBKIN

BY S.C. Yuter

ATTORNEY.

March 15, 1960 S. LUBKIN 2,929,049
MAGNETIC RECORDING ERROR INDICATOR
Filed June 21, 1954 2 Sheets-Sheet 2

GATE 62

BUFFER 40

PULSE AMPLIFIER 32

DELAY LINE 58

RESHAPER 66

AMPLIFIER - INVERTER 56

INVENTOR.
SAMUEL LUBKIN
BY S.C. Yuter
ATTORNEY.

United States Patent Office 2,929,049

Patented Mar. 15, 1960

2,929,049

MAGNETIC RECORDING ERROR INDICATOR

Samuel Lubkin, Bayside, N.Y., assignor, by mesne assignments, to Curtiss-Wright Corporation, Carlstadt, N.J., a corporation of Delaware Application June 21, 1954, Serial No. 438,205

5 Claims. (Cl. 340—174)

This invention relates to magnetic recording systems, and more particularly to the indication of errors which may occur during the reproduction of information recorded in pulse signal form on a magnetic storage medium suitable for use with a data processing device such as an electronic digital computer.

A digital computer performs operations with numbers expressed in binary form. The binary system of computation, using the binary digits one and zero, is well suited to computers since a binary number may be expressed by one of two conditions; for example, either of two directions of magnetization on a unit area of a magnetic medium such as the surface of a magnetizable drum or the presence or absence of a magnetized area. If the area is magnetized in one direction, the digit it represents is a one. If the area is not magnetized or is magnetized in the other direction, the digit is zero.

In another form of magnetic recording a one is represented by a change in the flux pattern from a first direction to a second direction, and a zero is represented by a change in the flux pattern from the second direction to the first direction.

The magnetized areas storing information corresponding to individual digits are arranged in channels on the cylindrical surface of the drum. A magnetic head is associated with each channel. The gap between the pole pieces of each magnetic head is positioned next to the surface of the drum so that the magnetic head scans the channel and performs the operations of recording and playing back information in that channel.

Information is recorded by rotating the drum so that the unit areas in a selected channel pass the magnetic recording head associated with the selected channel while the head is energized by the signal current. The fringing flux produced in the vicinity of the gap of the magnetic head penetrates the surface of the drum to form magnetic flux variations. When the pattern of magnetic flux variations in the channel is later passed beneath the magnetic head, the variation and the change in direction of the flux as the areas pass the gap generates playback signals which are related to the original recording signals.

In order to minimize the amount of equipment required to record and play back information, common writing and reading circuitry is provided and electronic or relay head switching is utilized to select the appropriate channel.

All of this apparatus is subject to partial or complete failure and the consequent production of errors in the interpretation of the information.

Errors may occur due to failure of the recording system to properly record the information. For example, the recorded signal may be too weak to be detected on playback, thus improperly signalling the absence of information. Similarly, a partial or complete failure of the playback system would result in the loss of a signal and consequent computer error. Further, improper operation of the electronic or relay head switching system on writing or reading may result in information signal loss.

Errors are also produced by the inadvertent production of an information signal. For example, an undesired signal may be generated due to the improper operation of the head switching equipment or the breakdown of the reading circuitry.

An object of the invention is to provide a magnetic recording system with an automatic error indicating system.

Another object of the invention is to provide apparatus for constantly monitoring playback signals read from a magnetic medium.

A further object of the invention is to provide apparatus for indicating errors which may occur in a magnetic recording system employed as a storage device for an electronic digital computer.

In accordance with the preferred embodiment of the invention, error indicating apparatus for magnetically recorded signals is provided comprising signal reproducing means responsive to the recorded signals to produce pulses representing ones at a first output terminal and pulses representing zeros at a second output terminal, and means responsive to the simultaneous presence or absence of pulses at the first and second output terminals for producing a signal indicating an error.

Other objects, together with features and advantages of the invention will appear in the subsequent detailed description which is accompanied by drawings wherein:

Fig. 3 shows the schematic circuit of a gate.

Fig. 4 illustrates the detailed circuitry of the buffer.

Fig. 5 illustrates the schematic diagram of a pulse amplifier.

Figure 6:
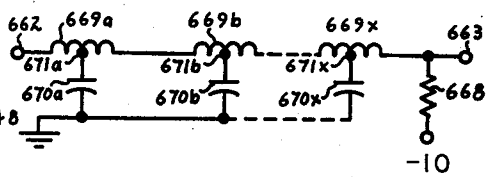

Fig. 6 schematically shows a delay line.

Figure 3:
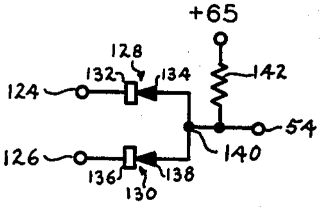
Figs. 3 to 8 illustrate in detail the apparatus shown in block symbol form in Figs. 1 and 2.
Figure 4:
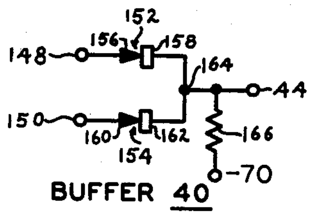
Figure 5:
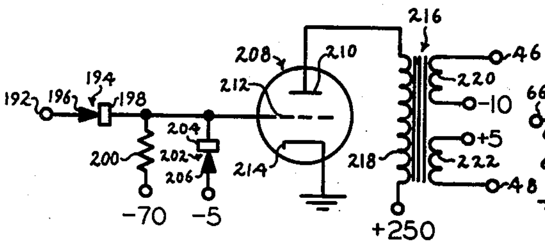
Figure 7:
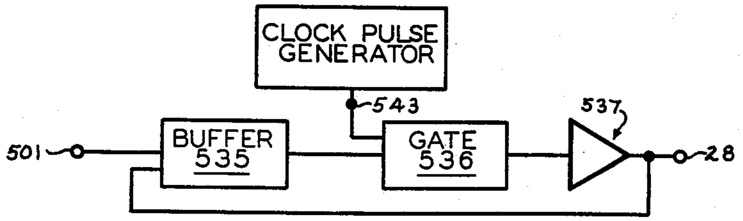

Fig. 7 is a schematic block diagram of a reshaper employing the circuits shown in detail in Figs. 3, 4 and 5.

Figure 8:
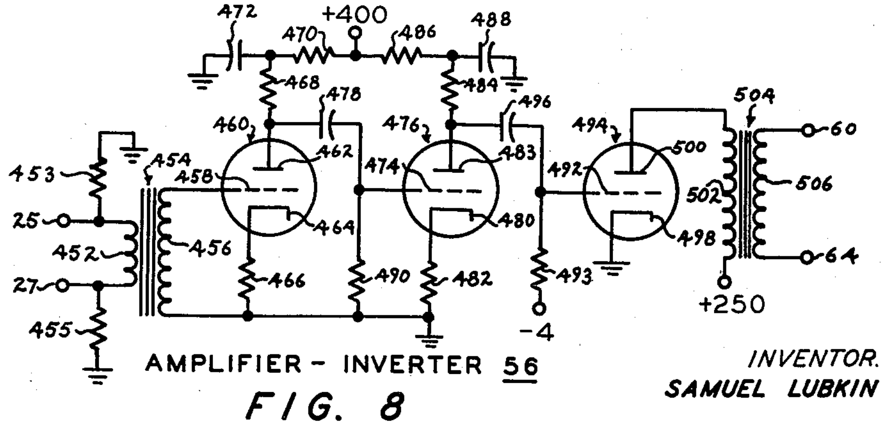

Fig. 8 illustrates the schematic diagram of the amplifier-inverter.

Figure 1:
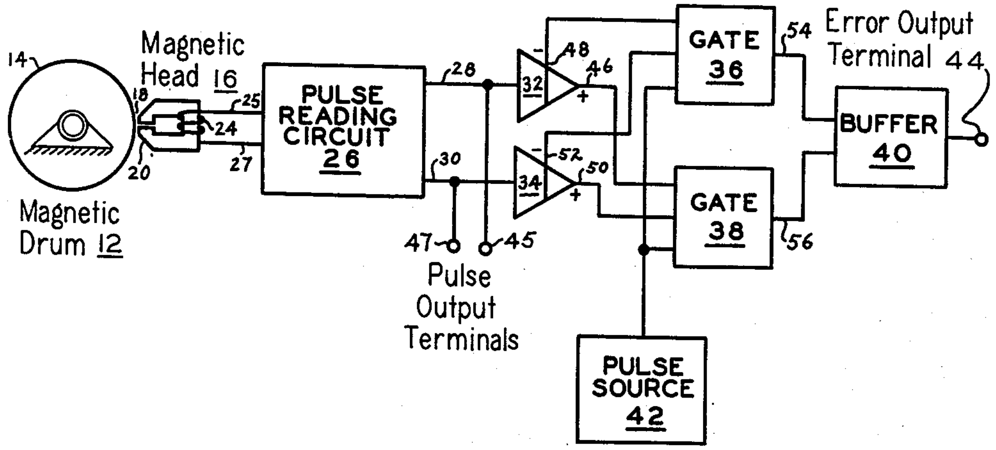
Fig. 1 is a schematic block diagram of a signal reproducing system embodying error indicating apparatus in accordance with the invention.

Referring more particularly to Fig. 1, the signal reproducing system in accordance with a preferred embodiment of the invention includes the magnetic drum 12, the magnetic head 16, the pulse reading circuit 26, the pulse amplifiers 32 and 34, the gates 36 and 38, the buffer 40, and the pulse source 42.

The magnetic drum 12 is preferably constructed from a nonmagnetizable metal and is rotated at high speed by suitable apparatus (not shown). The surface 14 of the magnetic drum 12 is thinly coated with a magnetizable material; for example, ferric or ferrous oxide.

The magnetic head 16 comprises the pole pieces 20 and the winding 24. The pole pieces 20 are separated by the gap 18 between them. The gap 18 is positioned adjacent to one of the channels on surface 14. The winding 24 is connected to the pulse reading circuit 26 via the input lines 25 and 27.

For purposes of convenience, only one magnetic head is shown connected to the pulse reading circuit 26. However, in actual practice a plurality of magnetic heads, each associated with a single channel, is connected to the pulse reading circuit by suitable relays or electronic switching circuitry (not shown).

The pulse reading circuit 26 produces positive pulses representing ones on the pulse output line 28 and positive pulses representing zeros on the pulse output line 30.

If a one is recorded on the surface 14 of the magnetic drum 12 it is detected by the magnetic head 16 and amplified, reshaped and retimed by the pulse reading circuit 26 to appear as a positive pulse on the pulse output line 28. In a similar manner, a zero recorded on the magnetic drum appears as a positive pulse on the pulse output line 30. These positive pulses are transmitted to the computer via the pulse output terminals 45 and 47 connected to the pulse output lines 28 and 30 respectively.

The information signal appearing at the pulse output terminal 45 is sufficient to represent the recorded information. The signal present at the pulse output terminal 47, known as the complement, may also be utilized in computer applications.

The pulse reading circuit 26 may be any circuit which produces a pulse representing a one at one terminal and a pulse representing a zero at another terminal.

The positive pulse representing a one is fed to the pulse amplifier 32 via the pulse output line 28. The pulse amplifier 32 has a positive output terminal 46 and a negative output terminal 48. In response to a positive pulse, the pulse amplifier 32 functions to transmit from its positive output terminal 46 a pulse which swings from minus ten to plus five volts. At the same time, a negative pulse which swings from plus five to minus ten volts is transmitted from its negative output terminal 48. At all other times the pulse amplifier 32 has a negative potential of ten volts at its positive output terminal 46 and a positive potential of five volts at its negative output terminal 48.

Positive pulses representing zeroes are fed from the pulse reading circuit 26 to the pulse amplifier 34 via the pulse output line 30. The pulse amplifier 34, having the positive output terminal 50 and the negative output terminal 52, functions in the same manner as the pulse amplifier 32.

The positive output terminals 46 and 50 of the pulse amplifiers 32 and 34 respectively are coupled to the gate 38. The negative output terminals 48 and 52 are connected to the gate 36. In addition, the gates 36 and 38 are fed positive pulses periodically by the pulse source 42.

The output terminals 54 and 56 of the gates 36 and 38 respectively are connected to the buffer 40. The output of the buffer 40 is connected to the error output terminal 44.

The pulse source 42 is chosen to generate a series of pulses which are in synchronism with the information pulses which appear at the pulse output lines 28 and 30. The pulse source 42 may be a source of narrow clock pulses in an associated computer (or other apparatus employing the magnetic recording system). The pulses are preferably narrower than the information pulses in order to pass sharply defined pulses to the buffer 40 when positive signals are simultaneously present at the other input terminals of either of the gates 36 and 38.

The gates 36 and 38 are of the "coincidence" type and each functions to pass the most negative signal present at its input terminals. Since the signal potential levels at the outputs of the pulse amplifiers 32 and 34 are arbitrarily chosen to be plus five volts (positive signals) and minus ten volts (negative signals) and the pulses from the pulse source 42 are chosen to swing from minus ten volts to plus five volts, the potentials of the signals which may exist at the input terminals of the gates are thereby limited. If a potential of minus ten volts is present at one of the input terminals of a gate, a potential of minus ten volts exists at the corresponding output terminal. When there is a coincidence of positive signals at all of the input terminals, a positive signal (swinging from minus ten to plus five volts) is transmitted from the associated output terminal to the buffer 40.

The buffer 40 is also known as an "or" gate. The buffer 40 functions to receive input signals via its input terminals and to pass the most positive signal. Since the signal potential levels arbitrarily chosen in the system are minus ten volts and plus five volts, either one of these potentials may exist at the input terminals of the buffer 40. If a positive potential of five volts exists at one or both of the input terminals, a positive potential of five volts exists at the error output terminal 44.

The basic principal of the invention is based on the fact that the simultaneous presence or absence of pulses on the pulse output lines 28 and 30 indicates an error. The reason for this is that in normal error-free operation when information is read from a channel, it appears as a series of signals representing ones and zeros. That is, either a signal representing a one is produced at the pulse output terminal 28 or a signal representing a zero is produced at the pulse output terminal 30. If pulses are simultaneously present at the pulse output terminals of the pulse reading circuit 26, an error has occurred. If pulses are simultaneously absent, an error has occurred.

Since the pulse reading circuit 26 includes reshaping and retiming circuitry which is synchronized with the pulses from the pulse source 42, the pulse condition of the output lines 28 and 30 is examined at times corresponding to the presence of pulses at the output of the pulse source 42.

If, during normal error-free operation a pulse representing a one is present at the pulse output line 28 and no pulse is present at the pulse output line 30, then the following potential conditions exist at the output terminals of the pulse amplifiers 32 and 34: a positive pulse which swings from minus ten to plus five volts appears at the positive output terminal 46; a negative pulse which swings from minus ten to plus five volts appears at the negative output terminal 48; a negative potential of minus ten volts is present at the positive output terminal 50; and a positive potential of five volts exists at the negative output terminal 52.

When a pulse swinging from minus ten to plus five volts is fed to the gates 36 and 38 from the pulse source 42, it is not passed by either of the gates 36 and 38 since gate 36 is blocked by the negative pulse fed to it from the negative output terminal 48, and gate 38 is blocked by the negative potential of ten volts which is present at the positive output terminal 50. Therefore, a positive pulse is not fed to the buffer 40 and the potential at the error output terminal 44 remains at minus ten volts signifying error-free operation.

When during normal error-free operation a pulse representing a zero appears on the pulse output line 30 and no pulse appears on the pulse output line 28, the following potential conditions exist at the output terminals of the pulse amplifiers 32 and 34: the potential at the positive output terminal 46 is minus ten volts; the potential at the negative output terminal 48 is plus five volts; a positive pulse which swings from minus ten to plus five volts appears at the positive output terminal 50; and a negative pulse which swings from plus five to minus ten volts is present at the negative output terminal 52.

The pulse transmitted by the pulse amplifier 34 appears in synchronism with a pulse from the pulse source 42. Neither gate 36 nor gate 38 will pass the pulse from the pulse source 42 since gate 36 is blocked by the negative pulse fed to it from the negative output terminal 52, and gate 38 is blocked by the negative potential of minus ten volts which is present at the positive output terminal 46. Therefore, the potential level at the error output terminal 44 remains at minus ten volts since a positive pulse is not present at either of the input terminals of the buffer 40. Thus, the production of an error is not indicated.

When an error occurs in the information recording or reproducing system such that pulses are simultaneously present at the pulse output terminals 28 and 30, a positive pulse in synchronism with the pulse transmitted from the pulse source 42 is fed from the positive output terminal 46 of the pulse amplifier 32 to the gate 38, and a positive pulse is also fed to the gate 38 from the positive output terminal 50 of the pulse amplifier 34. Therefore, at gate 38 there is a coexistence of three pulses each swinging from minus ten to plus five volts, which causes a pulse corresponding to the narrow pulse from the pulse source 42 to appear at the output terminal 56 of the gate 38 and be passed via the buffer 40 to the error output terminal 44 thus indicating the production of an error.

When an error occurs which produces an absence of pulses simultaneously at the pulse output lines 28 and 30, the potential levels at the input terminals of the gate 36 are positive since a positive potential of five volts exists at the negative output terminal 52 and a positive potential of five volts is present at the negative output terminal 48. Consequently the pulse from the pulse source 42 passes through the gate 36 and through the buffer 40 and appears at the error output terminal 44 to indicate an error.

In actual computer operation, a pulse appearing at the error output terminal 44 is used to cause the computer to re-read the same recorded signal. The repeated production of a predetermined number of error pulses is utilized to halt the computer operation. An audio or visual indication of the production of a repeated error may also be provided.

Therefore, in accordance with the invention, automatic apparatus for indicating errors which may occur in a magnetic recording system has been provided which may be used in connection with electronic digital equipment.

*Pulse reading circuit 26*

Figure 2:
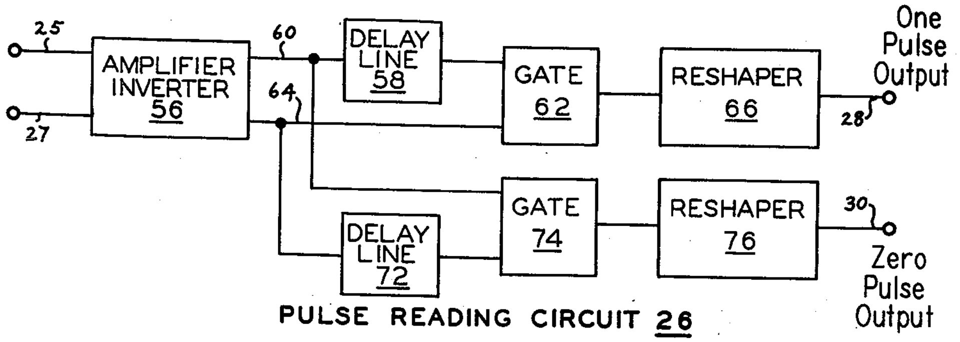
Fig. 2 is a schematic block diagram of a representative pulse reading circuit for the pulse reproducing system shown in Fig. 1.

As indicated above, the pulse reading circuit may be any circuit which produces a pulse on one terminal to indicate a one and a similar pulse on a second terminal to indicate a zero. A suitable pulse reading circuit is illustrated in Fig. 2. This circuit is described in detail and claimed in the co-pending application of Samuel Lubkin and Daniel Golden, Serial No. 357,502, now Patent No. 2,764,463, filed May 26, 1953.

The portion of the pulse reading circuit 26 which produces a pulse representing a one at the pulse output line 28 comprises the amplifier-inverter 56, the delay line 58, the gate 62 and the reshaper 66. The part of the pulse reading circuit 26 which generates a pulse representing a zero at the pulse output line 30 comprises the amplifier-inverter 56, the delay line 72, the gate 74 and the reshaper 76.

When a signal representing a one appears at the input lines 25 and 27 connected to the amplifier-inverter 56, an amplified playback signal appears at the playback signal line 60 and an inverted signal appears at the inverted signal line 64. The playback signal is coupled to the delay line 58 by the playback signal line 60. The delay line 58 in turn is connected to one input of the gate 62. The other input of the gate 62 receives the inverted signal from the amplifier-inverter 56 via the inverted signal line 64. During the co-existence of positive portions of the input signals to the gate 62 a gated signal is present at its output.

The output of the gate 62 is coupled to the reshaper 66 which reshapes the gated signal and retimes it so that it appears at the pulse output line 28 properly shaped and in synchronism with signals from the pulse source 42.

If a one is magnetically recorded on the surface of a drum as a flux pattern in the positive direction, a playback signal representing a one will first swing increasingly positive and then decreasingly positive as the maximum point of flux distribution is approached. At the maximum point when the rate of change of flux goes from positive through zero to negative, the playback signal will be of zero amplitude. Then the playback signal will swing increasingly negative then decreasingly negative and return to zero at the end of the flux distribution. The playback signal is then delayed by the delay line 58 before appearing at the gate 62 simultaneously with the inverted and non-delayed playback signal which is fed to the gate 62 via the inverted signal line 64. The amount of delay is preferably chosen to be one-quarter to one-half the period of the playback signal.

The gate 62 will pass a signal corresponding to the most negative signal present at any of the inputs to the gate 62. As will be apparent hereinafter, since the reshaper 66 will only operate on positive signals, the negative signal coincidence can be disregarded. Therefore, gated pulses will be reshaped and retimed and appear as a pulse representing a one at the pulse output line 28 only when portions of the inverted playback signal and the delayed playback signal are of positive polarity at the same time.

Negative recording pulses representing zeros are reproduced in substantially the same manner by the amplifier-inverter 56, the delay line 72, the gate 74 and the reshaper 76, to appear as a positive pulse on the pulse output line 30. In this case the playback signal swings increasingly negative and then decreasingly negative to zero, and then thereafter swings increasingly positive and then decreasingly positive to return to zero. The inverted playback signal is delayed by the delay line 72 before being fed to the gate 74. The common positive polarity portions of the signals present at the inputs to the gates 74 are passed, reshaped and retimed by the reshaper 76, to appear as positive pulses representing zeros at the pulse output line 30.

In summary, the pulse reading circuit 26 functions to reproduce information stored on the drum by generating a playback signal and an inverted playback signal corresponding to the recorded information delaying the playback signal and then combining the positive polarity portions of the delayed signal and the inverted signal.

*Detailed description of block symbols*

The schematic details of gate 62 are shown in Fig. 3. Gate 62 includes the crystal diodes 128 and 130. Each of the input terminals 124 and 126 is coupled to one of the crystal diodes 128 and 130. Crystal diode 128 comprises the cathode 132 and the anode 134. Crystal diode 130 comprises the anode 138 and the cathode 136. More particularly, the input terminals 124 and 126 are respectively coupled to the cathode 132 of the crystal diode 128 and the cathode 136 of the crystal diode 130. The anode 134 of the crystal diode 128 and the anode 138 of the crystal diode 130 are interconnected at the junction 140. The anodes 134 and 138 are coupled via the resistor 142 to the positive voltage bus 65.

If negative potentials are simultaneously present at the input terminals 124 and 126, both of the crystal diodes 128 and 130 conduct, since the positive supply bus 65 tends to make the anodes 134 and 138 more positive. The voltage at the junction 140 will then be minus ten volts since, while conducting, the anodes 134 and 138 of the crystal diodes 128 and 130 assume the potential of the associated cathodes 132 and 136.

When a positive signal is fed only to the input terminal 124, the cathode 132 is raised to a positive five volts potential and is made more positive than the anode 134, so that crystal diode 128 stops conducting. As a result, the potential at the junction 140 remains at the negative ten volts level. In a similar manner, when a positive signal is only present at the input terminal 126, the voltage at the junction 140 will not be changed.

When the signals present at both input terminals 124 and 126 are positive, the anodes 134 and 138 are raised to approximately the same potential as their associated cathodes 132 and 136 and the potential at the junction 140 rises to a positive potential of five volts.

The potential which exists at the junction 140 is transmitted from the gate 62 via the output terminal 54.

In the above described manner, the gate 62 is frequently used as a switch to govern the passage of one signal by the presence of one or more signals which control the operation of the gate 62.

It should be understood that the potentials of plus five volts and minus ten volts used for purpose of illustration are approximate, and the exact potentials will be effected in two ways. First, they will be affected by the value of the resistance 142 and its relation to the impedances of the input circuits connected to the input terminals 124 and 126. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 54 to prevent the terminal from becoming more negative than a predetermined voltage level to protect the diodes 128 and 130 against excessive back voltages and to provide the proper voltage levels for succeeding circuits.

Gate 74 is the same as gate 62. Gates 36 and 38 are similar to gate 62 except that an additional crystal diode is provided to accept the third input signal.

The schematic details of the buffer 40 are shown in Fig. 4. The buffer 40 includes the two crystal diodes 152 and 154. The crystal diode 152 comprises the anode 156 and the cathode 158. Crystal diode 154 comprises the anode 160 and the cathode 162. The anode 156 of the crystal diode 152 is coupled to the input terminal 148. The anode 160 of the crystal diode 154 is coupled to the input terminal 150. The cathodes 158 and 162 of the crystal diodes 152 and 154, respectively, are joined at the junction 164 which is coupled to the output terminal 44, and via the resistor 166 to the negative supply bus 70. The negative supply bus 70 tends to make the cathodes 158 and 162 more negative than the anodes 156 and 160, respectively, causing both crystal diodes 152 and 154 to conduct.

When negative ten volt signals are simultaneously present at input terminals 148 and 150, the crystal diodes 52 and 154 are conductive, and the potential at the cathodes 158 and 162 approaches the magnitude of the potential at the anodes 156 and 160. As a result, a negative potential of ten volts appears at the output terminal 44.

If the potential at one of the input terminals 148 or 150 increases to plus five volts, the potential at the junction 164 approaches the positive five volts level as this voltage is passed through the conducting crystal diode 152 or 154 to which the voltage is applied. The other crystal diode 152 or 154 stops conducting since its anode 156 or 160 becomes more negative than the junction 164. As a result, a positive potential of five volts appears at the output terminal 44.

If positive five volt signals are fed simultaneously to both input terminals 148 and 150, a positive potential of five volts appears at the output terminal 44, since both crystal diodes 152 and 154 will remain conducting. Thus the buffer 40 functions to pass the most positive signal received via the input terminals 148 and 150.

The detailed circuitry of the pulse amplifier 32 is shown in Fig. 5. The detailed circuitry of pulse amplifier 34 is similar to pulse amplifier 32.

The pulse amplifier 32 includes the vacuum tube 208, the pulse transformer 216 and associated circuitry. The vacuum tube 208 comprises the cathode 214, the grid 212 and the anode 210. The pulse transformer comprises the primary winding 218 and the secondary windings 220 and 222.

The crystal diode 194 couples the grid 212 of the vacuum tube 208 to the input terminal 192, the anode 196 of the crystal diode 194 being coupled to the input terminal 192, and the cathode 198 being coupled to the grid 212. The negative supply bus 70 is coupled to the grid 212 via the resistor 200 and tends to make the crystal diode 194 conductive. The grid 212 and the cathode 198 of the crystal diode 194 are also coupled to the cathode 204 of the crystal diode 202, whose anode 206 is coupled to the negative supply bus 5. The crystal diode 202 clamps the grid 212 at a potential of minus five volts thus preventing the voltage applied to the grid 212 from becoming more negative than minus five volts.

When a voltage more positive than minus five volts is transmitted to the input terminal 192, the crystal diode 194 conducts and the voltage is applied to the grid 212. Since the crystal diode 202 clamps the grid 212 and the cathode 198 of the crystal diode 194 at minus five volts, any voltage more negative than minus five volts will cause the crystal diode 194 to become nonconductive, and that input voltage will be blocked at the crystal diode 194. Thus, the clamping action of the crystal diode 202 will not affect the circuitry which supplies the input voltage.

The cathode 214 of the vacuum tube 208 is connected to ground potential. The anode 210 of the vacuum tube 208 is coupled by the primary winding 218 of the pulse transformer 216 to the positive supply bus 250. The outer ends of the secondary windings 220 and 222 of the pulse transformer 216 are coupled respectively to the positive output terminal 46 and the negative output terminal 48. The inner ends of the secondary windings 220 and 222 are coupled respectively to the negative supply bus 10 and the positive supply bus 5.

A positive pulse which is fed to the grid 212 of the vacuum tube 208 will be inverted at the primary winding 218 of the pulse transformer 216 which is wound to produce a positive pulse in the secondary winding 220 and a negative pulse in the secondary winding 222. These pulses respectively drive the positive output terminal 46 up to a positive five volts potential and the negative output terminal 48 down to a negative ten volts potential because of the circuit parameters.

When the vacuum tube 208 is non-conducting, the negative ten volts potential is fed through the secondary winding 220 and appears at the positive output terminal 46. At the same time, the positive five volts potential is fed through the secondary winding 222 to the negative output terminal 48. These latter conditions are the normally existing conditions at the output terminals 46 and 48.

The delay line 58 shown in Fig. 6 comprises the input terminal 662 and the output terminal 663. When a pulse which is fed via the input terminal 662 to the delay line 58 reaches the output terminal 663, the total delay provided by the delay line 58 has been applied.

The delay line 58 shown in Fig. 6 comprises a plurality of inductors 669 connected in series, with the associated capacitors 670 which couple a point 671 on each inductor 669 to ground. The delay line 58 is terminated by a resistor 668 in order to prevent reflections. The resistor 668 is connected from the output terminal 663 to the negative supply bus 10 so that, when no pulses are fed to the delay line 58, the output terminal 663 has a potential in the order of minus ten volts.

The detailed circuitry of delay line 72 is similar to delay line 58.

A reshaper of the type used in the system is an electronic circuit which functions to reshape and retime positive pulses which have become poorly shaped and attenuated.

The symbol for the reshaper 66 is illustrated in Fig. 7 and comprises an input terminal 501, one retiming terminal 543 which receives reshaping and retiming pulses (also designated clocking pulses) and one positive output terminal 28.

Except when positive pulses are fed to the input terminal of the reshaper 66, a negative potential of ten volts is present at the positive output terminal 28.

When a pulse is fed to the reshaper 66 via the input terminal 501, the pulse is reshaped by a clock pulse (received via the terminal 543), which is timed and is then transmitted from the reshaper 66 via the positive output terminal 28.

The detailed circuitry of the reshaper 66 is illustrated in Fig. 7 in which use is made of logical symbols previously described.

The reshaper 66 comprises the buffer 535, the gate 536 and the amplifier 537 in series. A positive pulse which is fed via the input terminal 501 of the buffer 535 is passed to the gate 536.

A series of identical clock pulses which are generated in the clock pulse generator are transmitted to the gate 536 via the clock terminal 543. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 536.

When the attenuated positive pulse reaches its full magnitude at the gate 536, the coinciding clock pulse is gated through to the amplifier 537 and is amplified and causes a positive pulse to be transmitted from the positive output terminal 28.

The positive output terminal 28 is also coupled to one input of the buffer 535 so that a positive signal which appears at the positive output terminal 28 is regenerative and will continue to exist until the clock pulse terminates at the gate 536. This effectively permits the entire clock pulse to be gated through the gate 536, even though the original pulse has decayed before the end of the clock pulse.

Stated more generally, a clock pulse is passed through the gate 536 from the earliest coincidence of that clock pulse with the full magnitude of the attenuated pulse until the termination of that clock pulse. As a result, a clock pulse is substituted for the attenuated pulse in the system after a delay of about one-quarter of a pulse time.

The reshaper 76 is similar in construction to the reshaper 66.

Referring to Fig. 8 the schematic circuit of the amplifier-inverter 56 comprises an input transformer 454, triode amplifier 460 and 476, inverting amplifier 494 and an output transformer 504.

The magnetic head winding is connected to the primary winding 452 of the input transformer 454 via input lines 25 and 27. The resistors 453 and 455 couple each side of the winding to ground and serve to leak any charge developed on the magnetic head to ground. The secondary winding 456 of the input transformer 454 is coupled between the grid 458 of the triode amplifier 460 and ground. The triode amplifier 460 includes the anode 462 and the cathode 464. The cathode 464 is connected to ground via the resistor 466. The anode 462 is connected to a positive voltage source of four hundred volts via resistors 468 and 470 in series, with their junction bypassed to ground via bypass capacitor 472.

The anode 462 is coupled to the grid 474 of the triode amplifier 476 by the coupling capacitor 478. The triode amplifier 476 includes a cathode 480 connected to ground by means of the resistor 482 and an anode 483 coupled to the positive voltage source of four hundred volts by means of the resistors 484 and 486 in series, with their junction bypassed to ground by the bypass capacitor 488. The grid 474 is connected to ground via grid bias resistor 490.

The triode amplifiers 460 and 476 serve to amplify the playback signal detected by the magnetic head 16 as the magnetic drum 12 is rotated. The playback signal is coupled to the grid 492 of the amplifier-inverter triode 494 by the coupling capacitor 496. The grid 492 is coupled to a negative bias source of minus four volts by the resistor 493. The amplifier-inverter triode 494 includes a cathode 498 which is grounded, and an anode 500 which is coupled to a positive voltage source of two hundred fifty volts by the primary winding 502 of the output transformer 504. The amplified playback signal appears on the playback signal line 60 which is connected to one side of the secondary winding 506, and the inverted playback signal is present at the inverted signal line 64 which is connected to the other side of the secondary winding 506.

In order to simplify the explanation of the invention, all potential sources used throughout the system have been indicated by their individual magnitudes and polarities. It will be understood, of course, that these magnitudes and polarities are not critical and the invention is not so limited, the particular values being given by way of illustration only.

While only one representative embodiment of the invention disclosed herein has been outlined in detail, there will be obvious to those skilled in the art many modifications and variations accomplishing the foregoing objects and realizing many or all of the advantages, but which do not depart essentially from the spirit of the invention.

What is claimed is:

1. An error indicating apparatus for a data reproducer receiving signals representing binary digit ones and signals representing binary digit zeros and having a pair of output terminals, the first of which provides a signal for each binary digit one and the second of which provides a signal for each binary digit zero, said apparatus comprising a first amplifier connected to said first output terminal, a second amplifier connected to said second output terminal, each amplifier generating an output signal corresponding to its input signal and also generating a simultaneous blocking signal, a gate receiving the corresponding signals of said two amplifiers, a second gate receiving the blocking signals of said two amplifiers, a synchronizing means to open said gates to permit passage of a signal therethrough and an error indicator settable by a signal from either of said gates.

2. Error indicating apparatus for a signal reading device having two output terminals, on one or the other of which a signal should appear for each signal position read by said reading device, said error indicating apparatus comprising a pair of amplifiers, each amplifier having an input terminal, a normally positive output terminal and a normally negative output terminal and responsive to a signal applied to its input terminal to reverse the normal voltages of said output terminals, means connecting the input of each amplifier to one of said output terminals of said reading device, a gate connected to said normally positive terminals, a second gate connected to said normally negative terminals, synchronizing means to permit said gates to pass a signal when a signal is read by said reading device and an error indicator responsive to a signal passed by either gate.

3. Error indicating apparatus for a signal reading device having two output terminals, on one or the other of which a signal should appear for each signal position read by said reading device, said error indicating apparatus comprising a pair of amplifiers, each amplifier having an input terminal, a normally positive output terminal and a normally negative output terminal and responsive to a signal applied to its input terminal to reverse the normal voltages of said output terminals, means connecting the input of each amplifier to one of said output terminals of said reading devices, a pulse source producing pulses in synchronism with the output signals of said reading device and a combined gating and buffering means responsive to the output voltages of said output terminals and the pulses of said pulse source to indicate an error if other than one signal for each signal position appears on said output terminals of said reading device.

4. A signal reading device for a record medium having two types of signals thereon, said device comprising a signal detecting device, a pulse producing means responsive to said signal detecting device to produce a pulse on a first output terminal when a first type of signal is detected and a pulse on a second output terminal when a second type of signal is detected, a timing signal generator to indicate when a signal is detected and an error signaling device including a gate to pass a timing signal when neither output terminal is simultaneously pulsed, a second gate to pass a timing signal when both output terminals are simultaneously pulsed and a buffer to transmit a pulse from either gate to an output terminal.

5. A signal reading device for a record medium having two types of signals thereon, said device comprising a signal detecting device, a pulse producing means responsive to said signal detecting device to produce a pulse on a first ouput terminal when a first type of signal is detected and a pulse on a second output terminal when a second type of signal is detected, a timing signal generator to indicate when a signal is detected and an error signaling device including a pair of amplifiers, one amplifier connected to each output terminal and producing a conforming pulse and a complementary pulse for each pulse on its connected output terminal, a first gate to receive the conforming pulses, a second gate to receive the complementary pulses, a timing signal source to permit a gate receiving two coincident input pulses to pass a signal and a buffer to combine the outputs of said first and second gates onto an error indicating terminal.

References Cited in the file of this patent

UNITED STATES PATENTS

| | | |
|---|---|---|
| 2,609,143 | Stibitz | Sept. 2, 1952 |
| 2,615,127 | Edwards | Oct. 21, 1952 |
| 2,633,564 | Fleming | Mar. 31, 1953 |
| 2,675,538 | Malthaner | Apr. 13, 1954 |
| 2,675,539 | McGuigan | Apr. 13, 1954 |
| 2,821,696 | Shiowitz et al. | Jan. 28, 1958 |